INVENTORS
THEODORE A. FLANDERS
PHILIP V. NAPLES

BY  M. B. Tasker
            ATTORNEY 3,009,479
SAFETY SHUTOFF FOR HELIUM SUPPLIES
Theodore A. Flanders, Windsor, and Philip V. Naples, Newington, Conn., assignors to United Aircraft Corporation, East Hartford, Conn., a corporation of Delaware
Filed Aug. 7, 1959, Ser. No. 832,266
6 Claims. (Cl. 137—612.1)

This invention relates to nuclear power plants in which liquid metal is used as a heat transfer medium between the reactor and the radiator of the engine.

In such a power plant a system of pipes and valves is required to control the flow of liquid metal. An inert gas is employed, usually helium, to provide a backup pressure at each valve-operating mechanism equal to the liquid metal static pressure prevailing at that valve.

It is an object of this invention to decrease the probability of power plant failure resulting from loss of helium supply and, subsequently, liquid metal valve failures.

A further object of the invention is to insure the supply of inert gas to the system by providing means to shut off the connection to the gas supply of a faulty liquid metal valve in the event of a low pressure condition resulting from a large gas leak in the valve.

A still further object of this invention is to provide means to shut off the gas supply to a particular liquid metal valve in the event of a small gas leak, but only after the main gas supply has been depleted to the point where it is still adequate to make up for normal leakage in the remaining liquid metal valves and gas regulators of the system.

A further object of the invention is to provide means responsive to the liquid metal static pressure at the different liquid metal valve locations for regulating the inert gas backup pressure.

Figure 1:
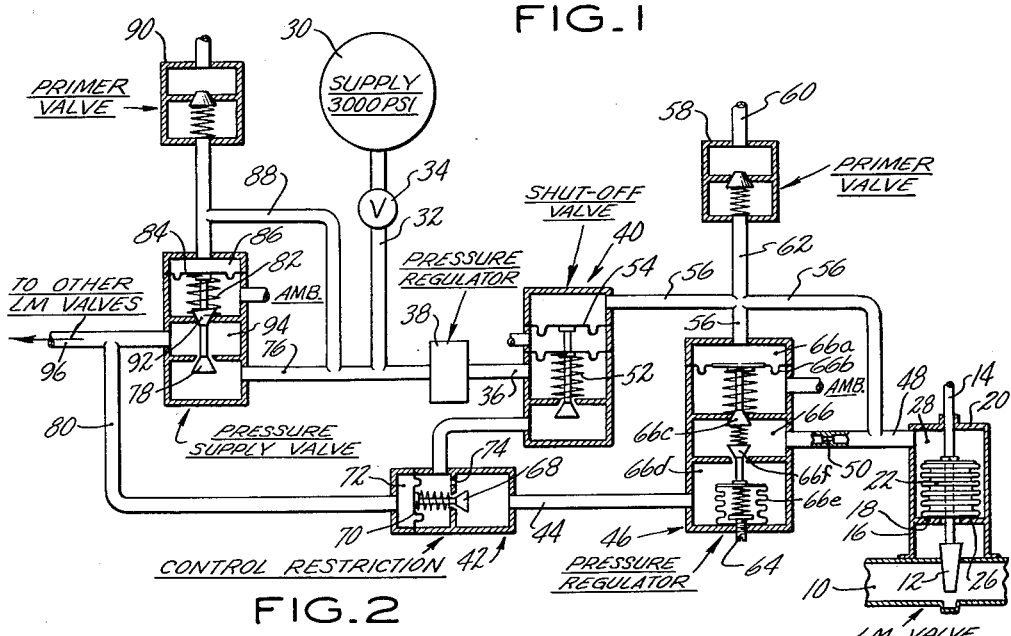
Figure 2:
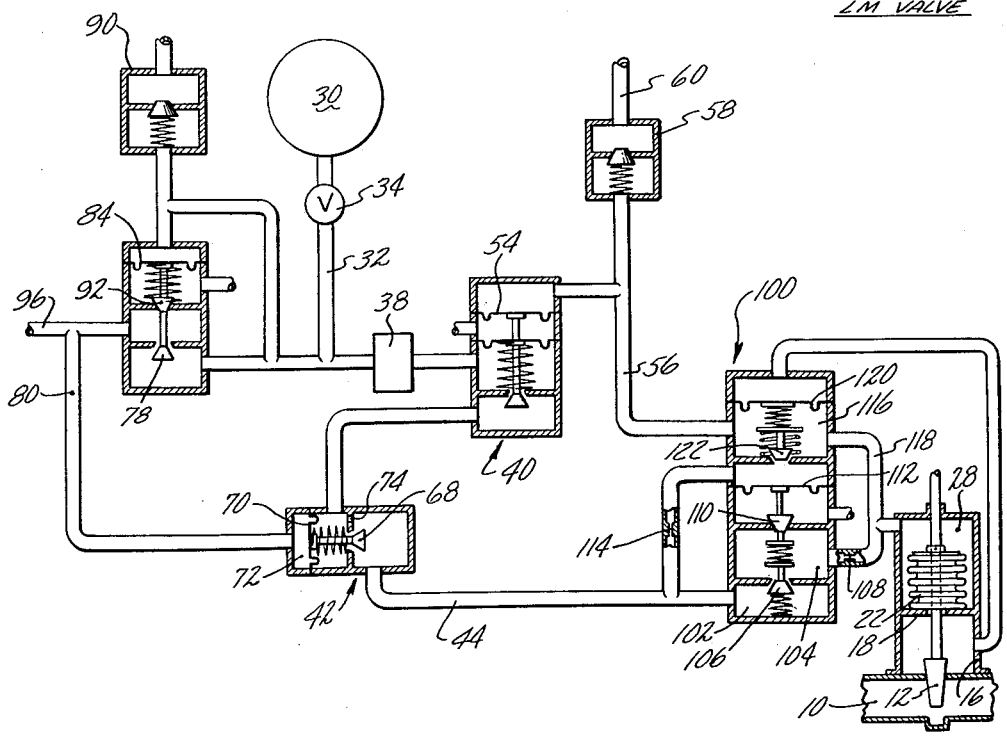

These and other objects and advantages of the invention will be pointed out or will be evident from the following detailed description of two embodiments of the invention shown in the accompanying drawing. In this drawing:

FIG. 1 shows somewhat diagrammatically a part of such a liquid metal valve system including one liquid metal valve and its control means; and FIG. 2 shows a modified pressure transmitter for the liquid metal valve which is biased by the liquid metal static pressure at the particular metal valve location.

In FIG. 1 a liquid metal pipe line 10 is controlled by valve 12 having an operating rod 14. The valve operating rod is enclosed in a casing 16 having walls 18 and 20 through which the rod extends. Bellows 22 has one end fixed to the rod 14 and has its other end fixed to wall 18 at 26, the bellows thus constituting a fluid-tight seal between the rod and the casing where it passes through the wall 18 of the casing. Casing 16 is somewhat larger than the bellows and forms a gas cavity 28 surrounding the bellows into which an inert gas is introduced and maintained at a pressure equal to the static pressure of the liquid metal on the opposite side of the bellows, thus preventing rupture of the bellows.

It will be understood that there are a large number of these liquid metal valves in the system and that the backup gas pressure for each valve is controlled by the safety shutoff system described herein. A source of inert gas under pressure, usually helium, is provided at 30 which supplies the backup gas for the cavities 28 of all the liquid metal valves 12 in the system. This source of gas may be, for example, under a pressure of three thousand pounds per square inch. All valves are connected to the inert gas source by conduit means including a conduit 32 having a shutoff valve 34. Each liquid metal valve has a conduit 36 having a pressure reducing valve 38, a shutoff valve 40, and a control restriction 42, a conduit 44, a pressure regulator 46, and a conduit 48 having fixed restriction 50 therein.

The shutoff valve 40 is normally biased by a spring 52 into closed position. Pressure responsive means, here a diaphragm 54, is provided for holding the shutoff valve open against its bias. A duct 56 is provided connecting conduit 48 with a chamber of shutoff valve 40 of which one wall comprises diaphragm 54. It will thus be evident that each shutoff valve 40 is normally held open by the pressure of the gas in its cavity 28. A primer valve 58 is provided having a connection 60 to an independent source of pressure gas. This primer valve is connected by a duct 62 to duct 56 and is used to provide an initial pressure to open the shutoff valve 40 and hold it open until the connection of the chamber including diaphragm 54 to the main gas supply 30 has been established. Valve 58 is essentially a spring-pressed check valve which allows gas under pressure to be introduced through the valve but is normally closed by its spring to prevent escape of the gas from the system. The pressure regulator is a well-known device which can be set by an adjustment 64 to provide any desired reduced pressure in its intermediate chamber 66 which in this instance is connected to the valve cavity.

Essentially pressure regulator 46 has, besides the intermediate downstream chamber 66, an upper chamber 66a, one wall of which comprises a diaphragm 66b carrying a valve 66c which controls venting of chamber 66 to atmosphere. Chamber 66a is connected through duct 56 with cavity 28. Valve 66c is biased closed by a compression spring. A lower or upstream chamber 66d is provided having as one wall a bellows 66e carrying a valve 66f which controls the flow of gas from source 30 into chamber 66. Valve 66f is biased into open position by a compression spring which can have its force varied by adjustment 64. With this arrangement the valve 66c will open to relieve to atmosphere any excess pressure in chamber 66 above the downstream pressure predetermined by the setting of adjustment 64.

The controlled restriction 42 consists of a normally closed valve 68 having a pressure responsive diaphragm 70 forming one wall of a chamber 72, and a fixed restriction 74 which is in parallel with the valve 68. Gas under pressure is supplied to the valve chamber 72 through a duct 76 which is connected to conduit 32 through a pressure supply valve 78 and conduit 80. Valve 78 is normally biased to closed position by a spring 82 but is normally held open by an operating diaphragm 84 in valve chamber 86 which is acted upon by gas under pressure supplied through a conduit 88 connected with conduit 76. A primer valve 90 is also provided, similar to valve 58 described above, for initially opening valve 78 when the valve 34 is closed. A second valve 92 is provided on the stem of valve 78 in confronting relation to valve 78 with an intermediate chamber 94 provided between the two valves. Chamber 94 which is in communication with duct 80 also communicates through a conduit 96 with the diaphragm chambers 72 of all of the liquid metal valves in the system. It will be evident that when the pressure in the source 30 drops to a predetermined value established by the spring 82, valve 78 will close, cutting off all communication between the gas source 30 and the diaphragm chambers 72 of the controlled restrictions for all of the liquid metal valves, the pressure in intermediate chamber 94 of the pressure supply valve and its connected conduits being vented to atmosphere through valve 92. This pressure may be set at any pressure below the normal pressure in source 30, for example, two thousand pounds per square inch. Whatever pressure is selected, however, it should be such that sufficient backup gas remains in the source 30 to take care of the normal leakage in all the liquid metal valve cavities and pressure regulators of the system.

In operation, the valves are normally in the positions shown in FIG. 1 and the pressure supplied by regulators 46 to the cavities 28 of the several liquid metal valves is equal to the static liquid metal pressure at the several valves. If a large leak occurs in the cavity 28 of any valve there occurs a big drop in pressure in the gas cavity of that valve due to restriction 50. As a result, the shutoff valve 40 associated with the leaky liquid metal valve will close since the gas pressure acting on the diaphragm 54 of valve 40 will be unable to maintain this valve open against the bias of its spring. The pressure at which valve 40 closes may be, for example, twenty pounds per square inch in the liquid metal valve cavity. Once the shutoff valve 40 has closed, it will remain closed. It will thus be evident that upon the occurrence of a serious leak in the operating mechanism of any particular liquid metal valve, this particular valve will be immediately isolated from the gas source 30 and the supply of gas to the remaining liquid metal valves will be safeguarded.

If a slow leak should develop in a liquid metal valve cavity, the flow of gas through valve 68 and the parallel restriction 74 will be sufficient to maintain a satisfactory gas backup pressure in the cavity of the leaky valve and it is desirable to continue to supply gas to the leaking cavity until the supply of gas 30 is so depleted that only enough remains to properly supply the remaining valves.

Under this condition it is desirable to cut off the supply to the leaky valve. This is accomplished by the controlled restriction 42, one of which is provided for each liquid metal valve. When the pressure in the supply 30 drops to 2000 lbs., which has been selected by way of example as the pressure at which the system can no longer tolerate the leaky valve cavity, valve 78 will close under the action of spring 82 because the gas pressure in chamber 86 is no longer high enough to overcome the pressure of this spring. The conduit 96 and all the connected conduits 80 to the diaphragm chambers 72 of all the controlled restrictions 42 will be vented to atmosphere by the valve 92 and, consequently, all of the valves 68 of these controlled restrictions will close. Gas flowing from supply 30 to the several valve cavities must now pass through the smaller fixed restriction 74 of the several controlled restrictions 42. If the valve cavity of a particular valve is not leaking, or has only the loss of gas due to normal leakage, the pressure in the valve cavity will be maintained above the twenty pounds per square inch critical level. However, if a slow leak exists from the cavity, there will be a considerable flow through the fixed restriction 74 accompanied by a drop in pressure which will cause the shutoff valve 40 associated with the leaky liquid metal valve to close.

FIG. 2 shows a somewhat modified arrangement of the pressure regulator in which a pressure transmitter 100, instead of having the manual adjustment 64 of regulator 46 in FIG. 1, is controlled by the liquid metal static pressure at the particular liquid metal valve location. Thus, each pressure transmitter is reset by liquid metal pressure at different flight conditions to regulate the downstream helium gas pressure so that it is equal to the static pressure exerted by the liquid metal on the liquid metal side of the bellows seal. Pressure transmitters of this type are well-known in the art. They require a measurement of the liquid metal static pressure at the different liquid metal valve locations. As a result they should be used only if the bellows in the liquid metal valve cavity cannot be made strong enough to withstand the greatest differential pressure of inert gas to liquid metal encountered at all flight conditions.

As shown in FIG. 2, inert gas from source 30 flows through conduit 32, pressure reducer 38, shutoff valve 40, controlled restriction 42 and duct 44 to chamber 102 of pressure transmitter 100 where its flow into chamber 104 is controlled by valve 106. From chamber 104 it flows through restriction 108 to cavity 28 of liquid metal valve 12. Bleeding of gas in chamber 104 to ambient is controlled by valve 110 carried by diaphragm 112, which is acted upon by inert gas from duct 44 as controlled by a restriction 114.

A duct 56 leading from the chamber of diaphragm 54 is connected to a chamber 116 of transmitter 100 which is connected by duct 118 to cavity 28 of the liquid metal valve 12. One wall of chamber 116 comprises a diaphragm 120, the other side of which is acted upon by liquid metal pressure in housing 16 on the opposite side of bellows 22 from the gas in cavity 28. Diaphragm 120, therefore, exerts a force against valve 122 which is a measure of the liquid metal static pressure in valve 12.

It will be evident that as a result of this invention a gas backup system has been provided to supply an inert gas backup pressure to the bellows cavity of each liquid metal valve of the system equal to the liquid metal static pressure at that level. It will also be evident that the system, in accordance with this invention, is safeguarded in the event that a large gas leak develops in any liquid metal valve cavity. It will further be evident that, in accordance with this invention, the helium supply will be maintained to a leaky liquid metal valve cavity having a slow leak as long as possible without jeopardizing the gas supply for the remaining liquid metal valves, the cavity having the slow leak being cut off from the gas supply only when the gas supply has been depleted to the danger point.

While the invention has been described in connection with liquid metal valves, it will be readily apparent that the invention is not limited in its use to liquid metal valves, but that it is equally applicable to any system requiring the use of backup gas pressure.

We claim:

1. In a gas backup system, in combination, a plurality of cavities in which gas pressure is to be maintained, a source of inert gas under pressure, separate conduit means for supplying gas to each cavity, a shutoff valve in each conduit means biased into closed position, pressure responsive means associated with each valve for holding it in open position against said biasing means, a duct connecting the pressure responsive means of each valve to its associated cavity, and means for closing the shutoff valve supplying any leaky cavity in the system whenever a slow leak in that cavity has depleted said source to a predetermined pressure, said last-mentioned means comprising a pressure supply valve common to all said cavities normally biased to closed position and having pressure responsive means for holding it open, a duct connecting the pressure responsive means of said pressure supply valve to said gas source, a restriction valve in said conduit means for each cavity normally biased to closed position and having pressure responsive means for holding it open, said restriction valve being located between each cavity and its associated shutoff valve, a duct connecting said gas source to the pressure responsive means of each of said restriction valves, said pressure supply valve controlling said last-mentioned duct, and a fixed restricted orifice in the conduit means between each cavity and its shutoff valve.

2. In a gas backup system for liquid metal valves, in combination, a plurality of liquid metal valves, each having operating means, a casing enclosing the operating means of each valve and forming a gas cavity, a source of inert gas under pressure, separate conduit means connecting each valve cavity with said source, a shutoff valve in each conduit means biased into closed position, pressure responsive means associated with each shutoff valve for holding it in open position against said biasing means, a duct connecting the pressure responsive means of each shutoff valve to its associated valve cavity, and means for closing the shutoff valve of any liquid metal valve in the system whenever a slow leak in its cavity has depleted said source to a predetermined pressure, said last-mentioned means comprising a pressure supply valve common to all of said liquid metal valves normally biased to closed position and having pressure responsive means for holding it open, a duct connecting the pressure responsive means of said pressure supply valve to said gas source, a restriction valve in said conduit means for each liquid metal valve normally biased to closed position and having pressure responsive means for holding it open, said restriction valve being located between each gas cavity and its associated shutoff valve, a duct connecting said gas source to the pressure responsive means of each of said restriction valves, said pressure supply valve controlling said last-mentioned duct, and a fixed orifice in the conduit means between each liquid metal valve cavity and its shutoff valve.

3. In a gas backup system for liquid metal valves, in combination, a plurality of liquid metal valves, each having operating means, a casing enclosing the operating means of each valve and forming a gas cavity, a source of inert gas under pressure, separate conduit means connecting each valve cavity with said source, a shutoff valve in each conduit means biased into closed position, pressure responsive means associated with each shutoff valve for holding it in open position against said biasing means, a duct connecting the pressure responsive means of each shutoff valve to its associated valve cavity, and means for closing the shutoff valve of any liquid metal valve having a slow gas leak from its cavity comprising a controlled restriction in the conduit of each shutoff valve having a fixed restriction in parallel therewith, said controlled restrictions of the several liquid metal valves being located between each shutoff valve and its connected cavity and having means responsive to pressure of gas in said source for maintaining them in open position so long as said gas source is above a predetermined pressure.

4. In a gas backup system for liquid metal valves, in combination, a plurality of liquid metal valves, each having operating means, a casing enclosing the operating means of each valve and forming a gas cavity, a source of inert gas under pressure, separate conduit means connecting each valve cavity with said source, a shutoff valve in each conduit means biased into closed position, pressure responsive means associated with each shutoff valve for holding it in open position against said biasing means, a duct connecting the pressure responsive means of each shutoff valve to its associated valve cavity, and means for effecting delayed closing of the shutoff valve of any liquid metal valve upon occurrence of a slow leak from its gas cavity, said last-mentioned means comprising a restricting valve in said conduit means for each liquid metal valve located between said shutoff valve and its connected gas cavity, said restricting valves having means normally biasing them to closed position and pressure responsive means for holding them open against their bias, each restricting valve having a fixed restriction in parallel therewith of smaller cross-sectional area that the valve, a pressure supply duct connecting the pressure responsive means of each restricting valve to said gas source, a pressure supply valve common to all of the restricting valves of the system for controlling said pressure supply ducts, said pressure supply valve being biased to closed position and having pressure responsive means connected to said gas source for normally holding it open.

5. In a gas backup system for valves, in combination, a plurality of valves for controlling liquid metal flow, each having an operating mechanism, a casing enclosing the operating mechanism of each valve forming a gas cavity on the remote side of said operating mechanism from the liquid metal, a source of inert gas under pressure, separate conduit means connecting each valve cavity with said source, a shutoff valve in each of said conduit means having means constantly biasing it into closed position, a pressure regulator in each of said conduit means between each shutoff valve and its connected cavity for supplying a predetermined pressure of gas to its connected cavity, each of said shutoff valves having means responsive to said predetermined pressure for holding it open against its biasing means, means for connecting said pressure responsive means to said cavity, each of said pressure regulators including a liquid metal pressure transmitter responsive to the liquid metal static pressure at its liquid metal valve location for regulating the inert gas backup pressure in said associated cavity.

6. In a gas backup system for valves, in combination, a plurality of valves for controlling liquid metal flow, each having an operating mechanism, a casing enclosing the operating mechanism of each valve forming a gas cavity on the remote side of said operating mechanism from the liquid metal, sealing means for said gas cavity, a source of inert gas under pressure, separate conduit means connecting each valve cavity with said source, a shutoff valve in each of said conduit means having means constantly biasing it into closed position, a pressure regulator in each of said conduit means between each shutoff valve and its connected cavity for supplying a predetermined pressure of gas to its connected cavity, each of said shutoff valves having means responsive to said predetermined pressure for holding it open against its biasing means, means for connecting said pressure responsive means to said cavity, each of said regulators having a pressure responsive diaphragm acted upon by the liquid metal at its associated valve location to regulate the inert gas pressure in its connected cavity to equal the static pressure exerted by the liquid metal on the remote side of said sealing means.

References Cited in the file of this patent
UNITED STATES PATENTS

| | | |
|---|---|---|
| 1,406,026 | Jensenius | Feb. 7, 1922 |
| 2,444,703 | Jones | July 6, 1948 |
| 2,495,081 | Thomas | Jan. 17, 1950 |
| 2,497,549 | Heller | Feb. 14, 1950 |
| 2,524,730 | Lawhon | Oct. 3, 1950 |
| 2,778,720 | St. Clair | Jan. 22, 1957 |
| 2,896,660 | Lofink | July 28, 1959 |